Dec. 5, 1939.　　　J. MERCIER　　　2,181,949
JOINTED MECHANISM
Filed Dec. 7, 1937　　　3 Sheets-Sheet 1

Jean Mercier
INVENTOR
By [signature]
his ATTY

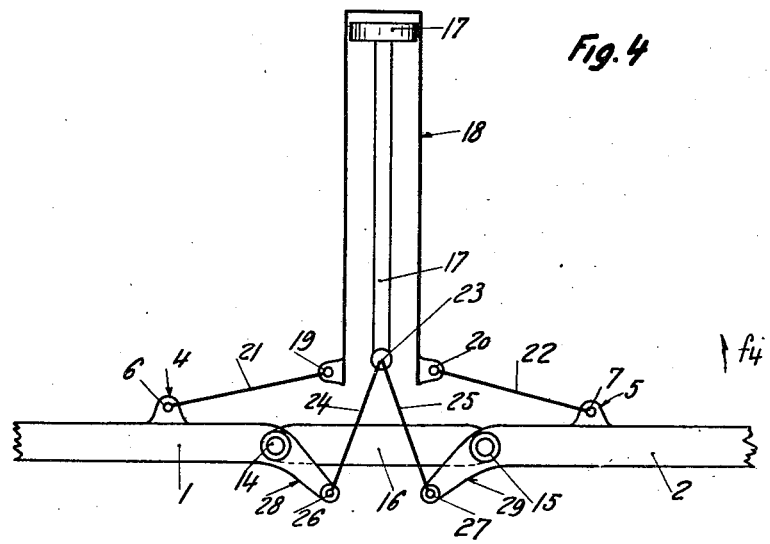
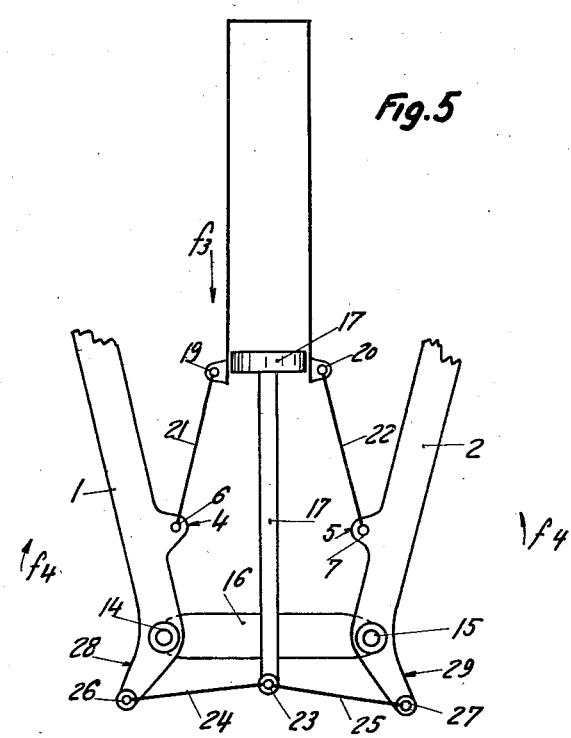

Dec. 5, 1939.  J. MERCIER  2,181,949
JOINTED MECHANISM
Filed Dec. 7, 1937  3 Sheets-Sheet 3

Jean Mercier
INVENTOR

Patented Dec. 5, 1939

2,181,949

UNITED STATES PATENT OFFICE 2,181,949

JOINTED MECHANISM

Jean Mercier, Neuilly-sur-Seine, France

Application December 7, 1937, Serial No. 178,446
In Belgium March 2, 1937

11 Claims. (Cl. 254—124)

The present invention relates to a jointed mechanism which is chiefly adapted for use on the disappearing landing gear of airplanes.

Landing devices of the disappearing type are already known, in which a jack comprising a piston and cylinder is mounted along the bisectrix of the angle formed by two parts of the jointed strut which are pivoted together. The said jack operates these two parts by means of two links which are pivoted respectively to each of the said parts, and also to a point on the cylinder of the jack, while the piston acts directly upon the pivot joint between the two parts of the said strut. In such landing gear, no simple and practical fastening of the two jointed parts, both in the extended and the folded position, has hitherto been provided.

The invention has essentially for its object a very simple mechanism which may be used as disappearing landing gear, and comprises fastening means which permit, on the one hand, of holding the landing gear in the extended position, and on the other hand, of holding the said landing gear when in the folded position.

The said mechanism is chiefly characterized by the fact that the aforesaid links or other members are located between the jack and the parts of the jointed strut, in such manner that they will be practically in line with each other when the strut is folded or unfolded, thus forming a support adapted for the fastening of the said parts of the strut in the position which they occupy.

This new arrangement affords a very simple means, which permits of preventing all vibration or flapping of the wing which would be produced by the landing gear when folded up, and also of assuring the landing in conditions of absolute safety.

Further characteristics will be disclosed in the following description.

In the accompanying drawings, which are given by way of example:

Figs. 4 and 5 are analogous views of another construction of the new device.

Figure 1:
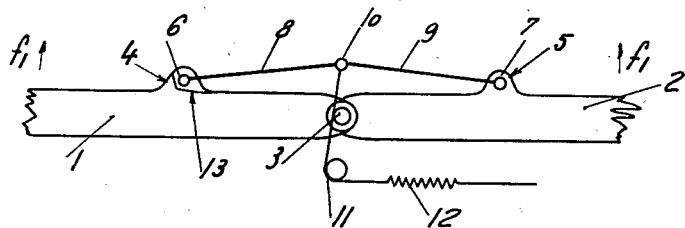
Fig. 1 is a diagrammatic front view, showing a constructional form of the mechanism in conformity with the invention, provided with manual control for the fastening device.

In the embodiment shown in Fig. 1, the mechanism comprises two parts 1 and 2 which are pivoted together at 3. Each of the parts 1 and 2 comprises a lug, or the like, 4—5, to which are pivoted at 6 and 7, two links 8 and 9, respectively, the other ends of which are pivoted together at 10. The point 10 is further connected by a flexible band or a wire 11 to an elastic member such as a spring 12, which is connected at its other end to a device for manual control. In order to prevent the joint 10 from descending too far with reference to the line containing the points 6 and 7, the lugs 4 and 5 may be provided with respective stops 13, for instance with which the rod 8 (or 9) will make contact.

The operation of the said mechanism is as follows: As the pivoted strut formed by the parts 1 and 2 is supposed to be in the unfolded position, as shown in Fig. 1, it is simply necessary to exert a certain traction upon the wire 11 in order to prevent the pivoting point 10 from rising and thus folding the strut. The pilot need only act upon the control of the spring 12 in order to maintain a certain tension in the wire 11 and thus to prevent the point 10 from rising. This provides a positive and absolute fastening of the pivoted strut in the extended position. In order to prevent the point 10 from descending too far, under the effect of an excessive tension, the stop 13 is provided, with which the link 8 (or 9) may make contact.

When it is desired to fold up the pivoted strut, it is simply necessary to act by the usual jack of this mechanism upon the point 10, which thus rises and draws the parts 1 and 2 in the direction of the arrows $f^1$.

In order to render the fastening automatic, use may be made of the jack or other device which controls the movements of folding and extension of the said strut.

Figure 2:
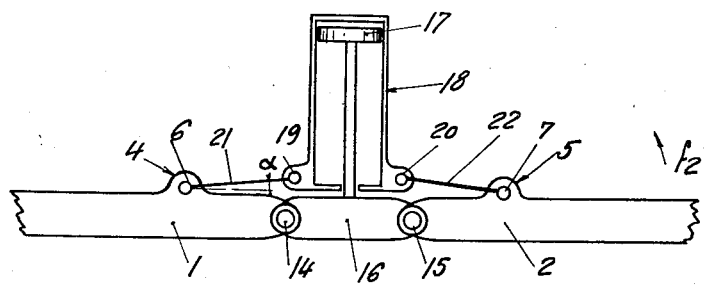
Figs. 2 and 3 are similar views of another construction of the mechanism in conformity with the invention, in the extended and the folded state respectively, in which the fastening is automatically effected.
Figure 3:
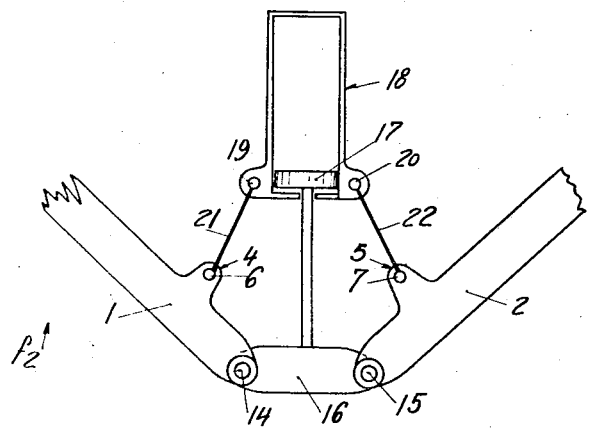

A first form of construction for such automatic fastening is shown in Figs. 2 and 3.

In the case of Figs. 2 and 3, the mechanism comprises two members 1 and 2 which are pivoted respectively in 14 and 15 to an intermediate member 16 which is connected to the piston 17 of a jack 18. The said jack is connected at its lower part, at 19 and 20, by links 21 and 22, to the points 6 and 7 of the bosses 4 and 5 of the members 1 and 2, respectively. The arrangement of the two links 21 and 22 is such that they will be practically in line with each other when the strut is extended.

The operation of this device is very simple. When in the unfolded position, as shown in Fig. 2, the points 6, 19, 20 and 7 are practically on a straight line, so that the pivoted device is very near the dead center, and thus all movement of the members 1 and 2 with reference to the member 16 and the jack 18, which are stationary, is prevented.

When it is desired to close up the strut and to bring it into the position shown in Fig. 3, fluid is supplied to the jack, the piston 17 descends, and it causes the said members to pivot in the direction of the arrows $f^2$, thus bringing them into the position observed in Fig. 3.

It is not indispensable that the links 21 and 22 shall be exactly in line when the strut is opened out. In fact, it will be readily observed that the fastening will remain sufficient as long as the tangent of the angle $\alpha$ (Fig. 2) formed by the link 21 for instance with the position which it would have if it were exactly in line with the link 22, remains below or equal to the coefficient of friction of the piston 17 in the cylinder 18.

In this case as in the preceding one, there is obtained a positive and reliable fastening of the device when in the extended position.

Figs. 4 and 5 represent another form of the device according to the invention, which operates in an entirely automatic manner, and which is provided with additional automatic fastening means by which the said strut can also be held in the folded position.

In this construction, the device comprises two members 1 and 2 which are pivoted at 14 and 15, respectively, to an intermediate member 16. The members 1 and 2 carry lugs 4 and 5, to which are pivoted two links 21 and 22, at 6 and 7 respectively. The other ends of the said links are pivoted at 19 and 20, respectively, to the cylinder 18 of the jack. The piston rod 17 of the jack is pivoted at 23 to one end of each of two links 24 and 25 the other ends of which are pivoted at 26 and 27 to two appendages 28 and 29 of the members 1 and 2, respectively.

The operation of the device is as follows: When the members 1 and 2 have the extended position, as shown in Fig. 4, the points 6, 19, 20 and 5 are practically on the same straight line. Thus the members 1 and 2 will have no tendency to fold upwardly. In fact, as the point 14 is slightly below the point 6, and as this point 14 is stationary, in principle, it will be observed that no movement of the member 1 can take place, except when the point 19 is itself raised. The same is true for member 2. In consequence, the fastening of the device is effected in the most approved manner.

When it is desired to close up the device, i. e., to bring it into the position shown in Fig. 5, fluid is admitted into the cylinder 18, and the piston now moves in the direction of the arrow $f^3$. The piston rod thus acts upon the links 24 and 25, which impart the movement to the appendages 28 and 29 of the respective members 1 and 2. At the same time, the cylinder 18 will rise, thus exerting a traction upon the links 21 and 22. These four links 21, 22 and 24, 25 cause the members 1 and 2 to pivot about the points 14 and 15 in the direction of the arrows $f^4$, until they take a position which is practically parallel with that of Fig. 5. In this position, the members 1 and 2 are still fastened, owing to the action of the links 24 and 25. In fact, the pivoting points 26, 23 and 27 are now practically in line, and form a support which prevents all pivoting movement of the members 1 and 2, provided the piston rod 17 remains stationary. This fastening is not of an absolute nature, as the descent of the landing device, or the unfolding of the closed device, must take place in conditions of absolute reliability and safety. In this case, the said links have an angular position which furthers the transmission of the forces required to unfold the said strut.

In the embodiment shown in Figs. 6 and 7, the device again comprises members 1 and 2 which are pivoted together at a point 3. As before, the said members 1 and 2 comprise lugs or like parts 3 and 4, to which are pivoted, at 6 and 7, two links 21 and 22 the other ends of which are pivoted at 19 and 20 to the cylinder 18 of the jack, respectively. The piston-rod 17 of the jack is pivoted at its lower end to the members 1 and 2, at the pivoting point 3. The other two links 24 and 25 are pivoted at one end at 26 and 27 to the lugs 28 and 29 of the members 1 and 2, respectively, and at the other end to the point 3.

Figure 6:
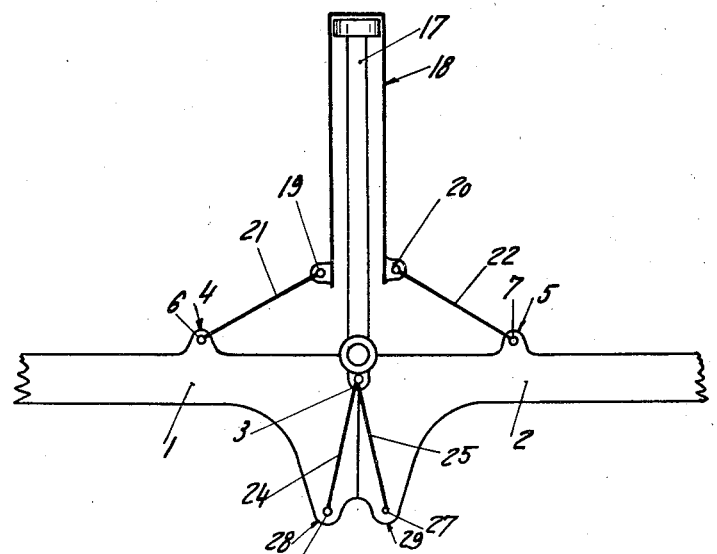
Figs. 6 and 7 are like views of another modification.

The operation of this device is similar to that of the device shown in Figs. 4 and 5. When it has the extended position as represented in Fig. 6, the fastening is exact, as in the case of Fig. 4.

Figure 7:
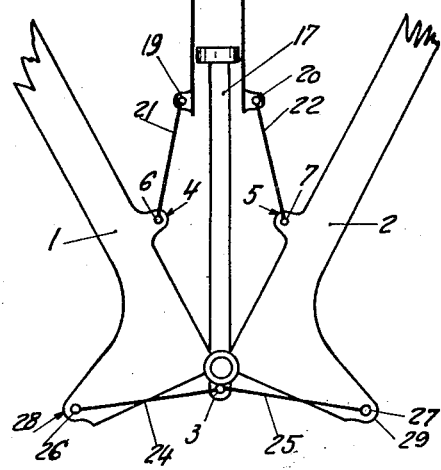

When the fluid is supplied to the jack, and when the piston 17 and the cylinder 18 have a mutual displacement, the links 21—22 and 24—25 cause the members 1 and 2 to pivot upwardly, thus bringing them into the position shown in Fig. 7. At this time, the pivoting points 26, 3 and 27 are practically in alignment, and the parts will be supported as in the case of Fig. 5. As before, the fastening in the folded position still takes place, but it is not of an absolute nature, and this will obviate the vibrations of the wings, but will not prevent the obtaining of all desired safety in the lowering and the extending of the mechanism.

It is observed that in the devices shown in Figs. 4 to 7, the mechanism comprises two pairs of links which act at the same time to open out or close up the said strut. For this reason, each link will be subject to a less force than in the case in which only two links are used. On the other hand, in the case in which four links are employed, the distribution of the forces, during the movements executed by the mechanism, is much more rational and uniform. Furthermore, it is observed in the drawings that one pair of links will always have an angular position which furthers the transmission of the force of the jack, in either direction.

Obviously, the said invention is by no means limited to the forms of construction herein described, which are given solely by way of example.

Having now described my invention, what I claim as new and desire to secure by Letters Patent, is:

1. A mechanism of the kind above referred to, comprising at least two parts pivotally connected together, a control element, such as a jack, comprising two principal members which may move one with respect to the other, and two pairs of transmission elements such as links, the elements of one of these pairs being pivoted to the said parts and to one of the principal members of the control element, whereas the elements of the second pair are also pivoted to said parts and to the other principal member of the control element, the whole arrangement being such that the transmission elements of one of the pairs are practically in alignment when the mechanism is at rest, thereby securely locking it in position.

2. A mechanism according to claim 1 wherein said control element consists of a jack of the piston-cylinder type, said transmission links of one pair being pivoted to the piston of the jack and those of the other pair to the cylinder.

3. A mechanism of the kind above referred to, comprising at least two parts pivotally connected together, a control element, such as a jack, comprising two principal members which may move one with respect to the other, and two pairs of transmission elements such as links, the elements of one of these pairs being pivoted to the said parts and to one of the principal members of the control element, whereas the elements of the second pair are also pivoted to said parts and to the other principal member of the control element, the whole arrangement being such that the transmission elements of one of the pairs are practically in alignment when the mechanism is at rest, thereby securely locking it in position, whereas the elements of the second pair occupy a favorable angular position facilitating the transmission of the movement to the pivoting parts.

4. A mechanism according to claim 1 wherein said control element directly acts upon the pivot of two adjacent parts of the mechanism.

5. A mechanism according to claim 1 wherein an intermediary member is provided between two adjacent parts of the mechanism, the control element acting thereupon.

6. A mechanism of the kind above referred to, comprising at least two parts pivotally connected together, a control element, such as a jack, comprising two principal members which may move one with respect to the other, and two pairs of transmission elements such as links, an intermediate member pivotally secured to and mounted between two adjacent pivoting parts, appendages on each of said adjacent parts disposed on both sides with respect to the jointing points on said intermediary member, the transmission elements of one pair being each pivoted at one of its ends upon one of said appendages and on the other end upon one of the members of said control element, whereas the transmission elements of the second pair are pivoted to the second appendage and to the other member of the control element.

7. A foldable strut for aircraft comprising two pivotally connected parts, a jack of the piston and cylinder type, and a number of pairs of links pivotally mounted on said pivoted parts and on the piston and cylinder of the jack, the arrangement of the links being such that when the strut is folded and unfolded, the links of some of the pairs of links are in alignment providing thus for a secure and positive locking of the strut, whereas the links of the other pairs occupy a favorable angular position which facilitates the transmission to the pivoted parts of the effort for folding and unfolding the strut.

8. A jointed mechanism chiefly adapted for use upon a retractable landing gear of aircraft, comprising a series of pivoted parts disposed in succession, and directly and pivotally connected together, a control element actuating these pivoting parts, and a series of transmission elements such as links pivotally secured at one end to said pivoted parts and at the other end to said control element, and adapted to actuate said parts, the points in which either of said transmission elements is secured upon the corresponding pivoted part being disposed aside the point in which said part is pivoted one upon the next one, and being so arranged that when the mechanism is unfolded a transmission element belonging to a pivoted part is substantially in alignment with that of another corresponding part, whereby the different pivoted parts are securely and positively locked in the occupied positions.

9. A jointed mechanism chiefly adapted for use upon a retractable landing gear of aircraft, comprising a series of pivoted parts disposed in succession and directly and pivotally connected together, a control element actuating these pivoted parts, and a series of transmission elements such as links pivotally secured at one end to said pivoted parts and to the other end to said control element, and adapted to actuate said parts, the points in which either of said transmission elements is secured upon the corresponding pivoted part being disposed aside the point in which said part is pivoted upon the next one, and being so arranged that when the mechanism is unfolded, the transmission element belonging to a pivoted part is substantially in alignment with that of another corresponding part, whereby the different pivoted parts are securely and positively locked in the occupied positions whereas the other transmission elements occupy a favorable angular position facilitating the transmission of the movement to the pivoted parts.

10. A mechanism according to claim 8, comprising at least three successive parts pivotally connected together, wherein said control element such as a jack comprises two members which may move one with respect to the other, one of these members being pivoted to one end of said two transmission elements, whereas the other member is secured to one of said pivoted parts, the other ends of said two transmission elements being pivotally secured upon the two other pivoted parts which are preferably adjacent said first mentioned part, the pivots of said transmission elements upon the control member and said pivoted parts being practically in alignment when the mechanism is unfolded, thus providing for a secure and positive locking of the mechanism.

11. A mechanism of the kind above referred to, comprising at least two parts disposed in succession and directly and pivotally secured together, a control element actuating at least two of said parts, and consisting of two mutually slidable members, appendages on said parts, at least two transmission elements such as links pivotally secured upon said appendages and one of said slidable members, and at least another pair of transmission elements secured to said parts and the other slidable member, the different pivots being practically in alignment when the mechanism is unfolded, thus providing for a secure and positive locking thereof.

JEAN MERCIER.